(12) United States Patent
Maruyama

(10) Patent No.: US 8,749,117 B2
(45) Date of Patent: Jun. 10, 2014

(54) VIBRATING BODY OF VIBRATORY DRIVE UNIT AND VIBRATORY DRIVE UNIT

(75) Inventor: Yutaka Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/325,719

(22) Filed: Dec. 14, 2011

(65) Prior Publication Data

US 2012/0153774 A1 Jun. 21, 2012

(30) Foreign Application Priority Data

Dec. 20, 2010 (JP) .................................. 2010-282681

(51) Int. Cl.
*H01L 41/047* (2006.01)
*H01L 41/053* (2006.01)
*H02N 2/00* (2006.01)

(52) U.S. Cl.
USPC ...................................... 310/323.02; 310/366

(58) Field of Classification Search
USPC ................ 310/328, 323.01–323.21, 365, 366
See application file for complete search history.

(56) References Cited

U.S. PATENT DOCUMENTS

| | | | |
|---|---|---|---|
| 6,051,911 A | 4/2000 | Kojima et al. | |
| 6,081,063 A | 6/2000 | Kasuga et al. | |
| 6,191,520 B1 | 2/2001 | Maruyama et al. | |
| 6,885,615 B1 | 4/2005 | Miyazawa et al. | |
| 6,989,624 B2 | 1/2006 | Tsukimoto et al. | |
| 7,078,847 B2 | 7/2006 | Miyazawa et al. | |
| 7,109,639 B2 | 9/2006 | Yamamoto et al. | |
| 7,187,104 B2 | 3/2007 | Yamamoto et al. | |
| 7,233,096 B2* | 6/2007 | Maruyama et al. | 310/323.02 |
| 7,253,552 B2 | 8/2007 | Miyazawa et al. | |
| 7,592,738 B2 | 9/2009 | Funakubo | |
| 8,058,773 B2* | 11/2011 | Kotani et al. | 310/323.16 |
| 2005/0242686 A1* | 11/2005 | Yamamoto et al. | 310/323.02 |
| 2009/0256445 A1* | 10/2009 | Kotani et al. | 310/323.16 |
| 2010/0327696 A1* | 12/2010 | Ro | 310/323.02 |
| 2011/0025168 A1 | 2/2011 | Maruyama | |

FOREIGN PATENT DOCUMENTS

| | | |
|---|---|---|
| JP | 61-191277 A | 8/1986 |
| JP | 01-017354 B2 | 3/1989 |
| JP | 2002-223576 A | 8/2002 |
| JP | 2002-223577 A | 8/2002 |
| JP | 2004-254417 A | 9/2004 |
| JP | 2004-304887 A | 10/2004 |
| JP | 2007-189802 A | 7/2007 |
| JP | 2007-33036 A | 12/2007 |
| JP | 2009-124791 A | 6/2009 |

* cited by examiner

*Primary Examiner* — Derek Rosenau
(74) *Attorney, Agent, or Firm* — Fitzpatrick, Cella, Harper & Scinto

(57) ABSTRACT

Provided is a vibrating body for a vibratory drive unit, including: a piezoelectric element including a piezoelectric layer and an electrode layer; and a plate-shaped elastic member bonded to the piezoelectric element, wherein the vibrating body drives a body to be driven, which is in contact with the plate-shaped elastic member, by a vibration generated in the plate-shaped elastic member through an application of a drive voltage to the piezoelectric element, and the plate-shaped elastic member has a front surface and a back surface each provided with one or a plurality of the piezoelectric elements to generate at least two different vibration modes through the application of the drive voltage to the one or the plurality of the piezoelectric elements.

7 Claims, 12 Drawing Sheets

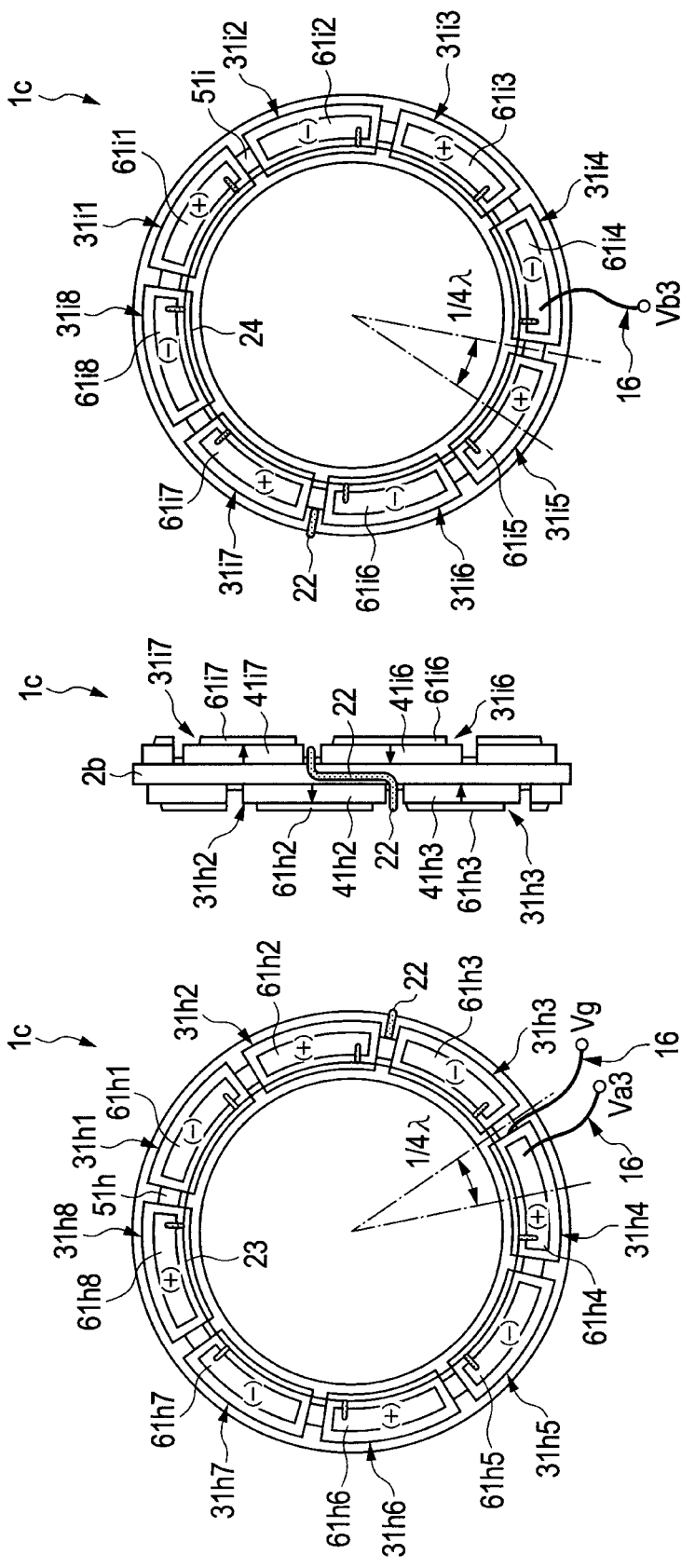

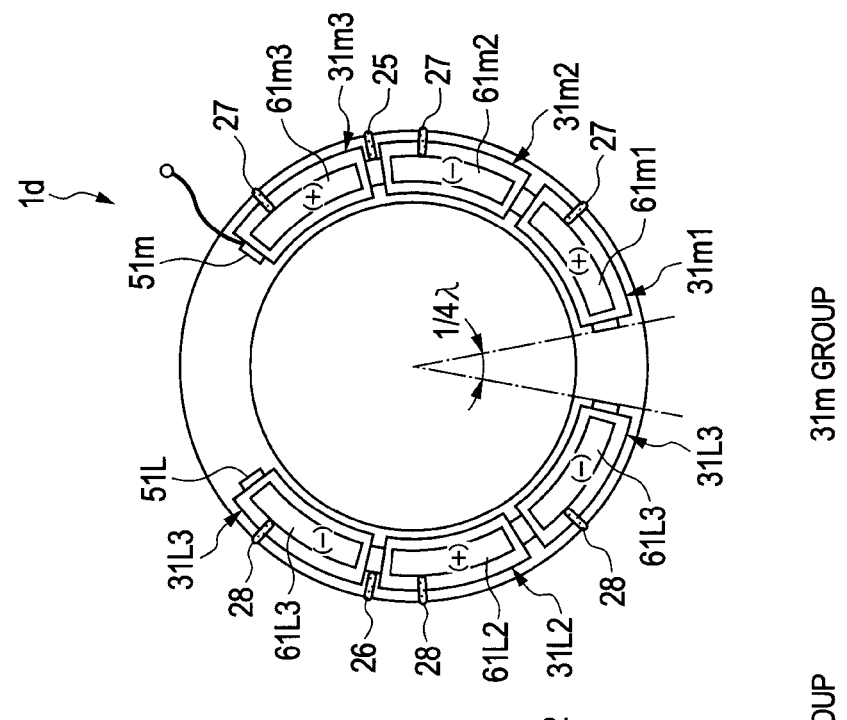
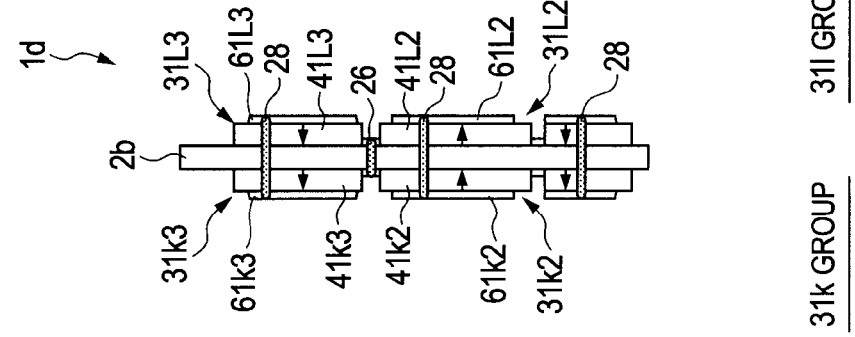
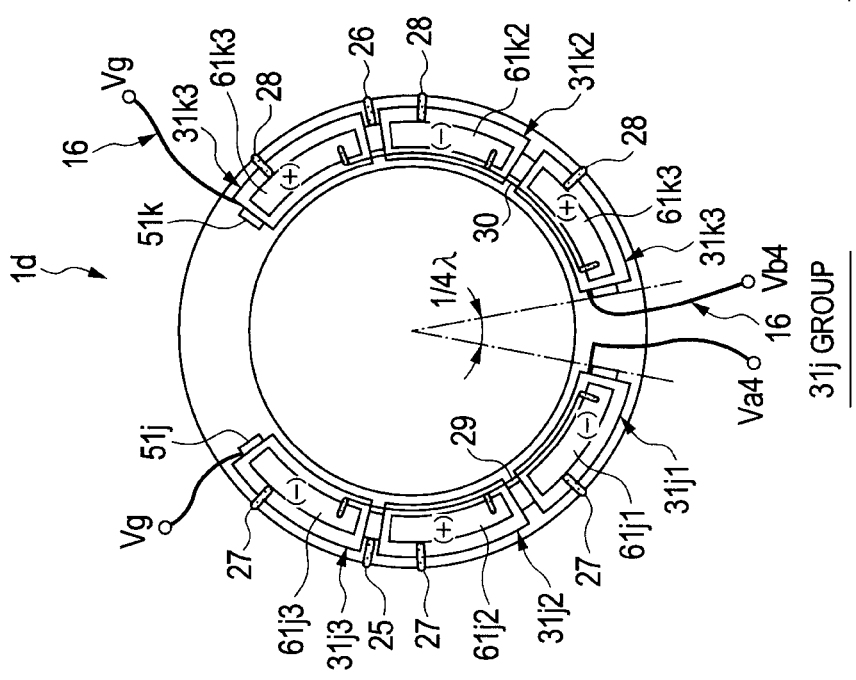

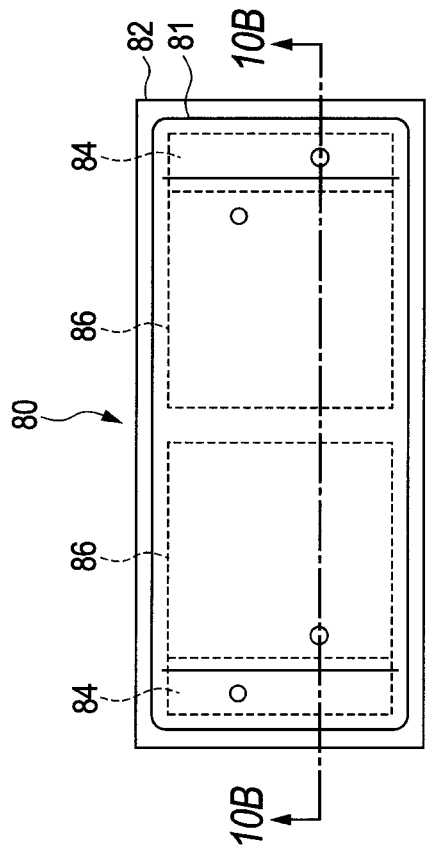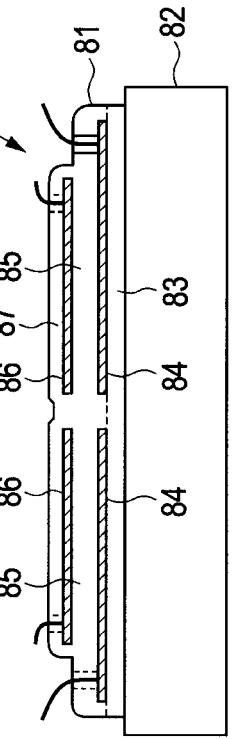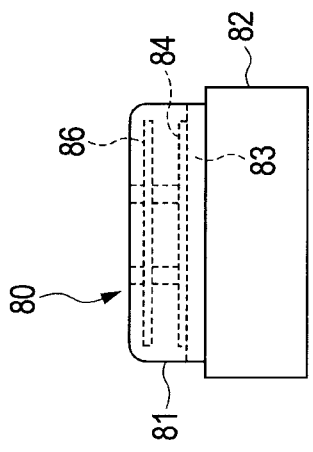

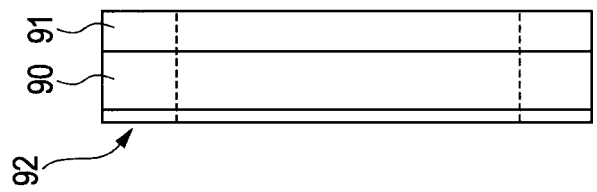
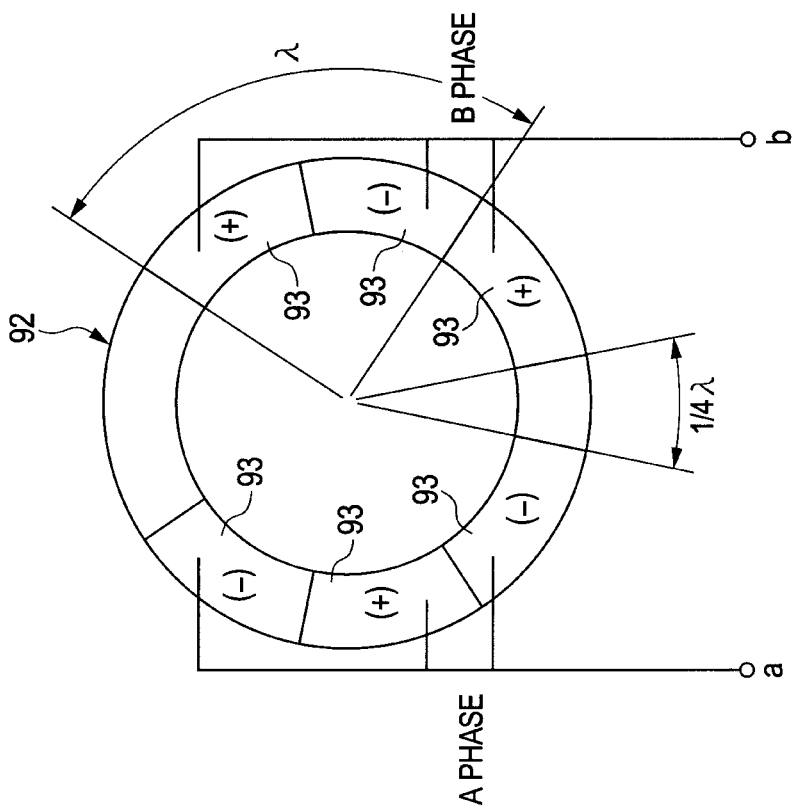

VIBRATING BODY OF VIBRATORY DRIVE UNIT AND VIBRATORY DRIVE UNIT

BACKGROUND OF THE INVENTION

1. Field of the Invention

The present invention relates to a vibrating body for a vibratory drive unit called a vibration wave actuator or the like, and a vibratory drive unit, and more particularly, to a vibrating body for a vibratory drive unit in which piezoelectric elements are provided respectively on front and back surfaces of a plate-shaped elastic member.

2. Description of the Related Art

Conventionally, in a vibratory drive unit (vibration wave actuator), a piezoelectric element is generally used as a vibration source for a vibrating body.

FIG. 8 is an outer perspective view of a vibratory drive unit 70 according to Japanese Patent Application Laid-Open No. 2004-304887.

The linear vibration wave actuator 70 includes a vibrating body 71 and a linear slider 76 that is brought into pressure contact with the vibrating body 71.

The vibrating body 71 includes a piezoelectric element 75 and a drive plate 72, and the piezoelectric element 75 is a laminated piezoelectric element in which multiple piezoelectric layers and multiple electrode layers are laminated alternately. The drive plate 72 is made of metal and is bonded to the piezoelectric element 75 with an adhesive.

The drive plate 72 has a plate portion formed in a rectangular shape and two protrusions 73 formed in a convex shape on the upper surface of the plate portion.

The tip surface of the protrusion 73 is a member to be brought into direct contact with the linear slider 76 that is a body to be driven, and hence, has abrasion resistance.

The vibrating body 71 of the linear vibration wave actuator 70 excites two bending vibration modes.

FIGS. 9A and 9B illustrate the two bending vibration modes.

As illustrated in FIG. 9A, one of the bending vibration modes is a secondary bending vibration in the long-side direction (X-direction) of the vibrating body 71, which has three nodes parallel to the short-side direction (Y-direction). Here, the protrusions 73 are each placed close to the position to be a node.

As illustrated in FIG. 9B, the other of the bending vibration modes is a primary bending vibration in the short-side direction (Y-direction) of the vibrating body 71, which has two nodes parallel to the long-side direction (X-direction). Then, the protrusions 73 are each placed close to the position to be an antinode of the primary bending vibration.

The two bending vibration modes are excited to generate an elliptic motion in the two protrusions 73. As illustrated in FIG. 8, the elliptic motion generates a relative locomotion power between the vibrating body 71 and the linear slider 76 that is in pressure contact with the vibrating body 71.

The relative locomotion power can drive the linear slider 76 linearly.

Further, the configuration illustrated in FIGS. 10A to 10C is a vibrating body 80 in a vibration wave actuator according to Japanese Patent Application Laid-Open No. 2009-124791.

The vibrating body 80 is assumed to be applied to the above-mentioned linear vibration wave actuator.

The vibrating body 80 includes a piezoelectric element 81 that is a vibration source and a ceramics substrate 82 that is a plate-shaped elastic member which vibrates integrally with the piezoelectric element 81.

The ceramics substrate 82 and the piezoelectric element 81 are integrally bonded (fixed) to each other by calcination. In addition, the piezoelectric element 81 is sintered.

In the piezoelectric element 81, a piezoelectric layer 83, an electrode layer 84, a piezoelectric layer 85, an electrode layer 86, and a piezoelectric layer 87 are laminated successively on one surface of the ceramics substrate 82 that is an elastic member.

The electrode layers 84 and 86 are placed so as to be divided into two parts, and the piezoelectric layers 85 which are divided into two parts and sandwiched between the electrode layers 84 and 86 are polarized after calcination. As a result, the above-mentioned two bending vibration modes can be excited by applying an AC voltage to the piezoelectric layers 85 divided into two parts.

In the vibratory drive unit as described in Japanese Patent Application Laid-Open No. 2004-304887 illustrated in FIG. 8, the laminated piezoelectric element and the drive plate (elastic member) made of metal are bonded to each other with an adhesive made of resin.

However, the adhesive is relatively soft, and hence, particularly when the temperature increases due to the drive, the adhesive becomes softer. Therefore, the influence on vibration attenuation of the vibrating body is large, which is a main factor for degrading the efficiency of the vibratory drive unit.

Further, when the vibratory drive unit is downsized, a fluctuation in thickness of an adhesive layer of an adhesive and the position precision relating to bonding more affect the performance of the downsized vibratory drive unit, which also increases the fluctuation in performance.

Further, the conventional piezoelectric element is produced independently through a large number of steps such as the formation from piezoelectric material powder, the calcination, and the subsequent mechanical processing and attachment of electrodes, which is one factor for increasing production cost.

To address the problem, the vibrating body according to Japanese Patent Application Laid-Open No. 2009-124791 has been devised, in which a piezoelectric element is directly bonded to an elastic member without using an adhesive, at the same time as the production of the piezoelectric element.

However, in the case of providing the piezoelectric element only on one surface of a ceramics substrate that is an elastic member, the elastic member is warped and deformed due to the contraction of the piezoelectric element during calcination.

Further, for a higher output which leads to the downsizing of the vibrating body, the output is small only with the piezoelectric element provided only on one surface. Therefore, it is desired that the piezoelectric element have a multi-layered structure, but there is a problem that the multi-layered structure only on one surface causes large warpage deformation.

SUMMARY OF THE INVENTION

The present invention has been made in view of the above-mentioned problems, and it is an object thereof to provide a vibrating body for a vibratory drive unit and a vibratory drive unit, which are capable of being reduced in cost and downsized due to a plate-shaped configuration and suppressing vibration attenuation to enhance a vibration efficiency irrespective of the downsizing so as to generate a large output stably.

The present invention provides a vibrating body for a vibratory drive unit, including: a piezoelectric element including a piezoelectric layer and an electrode layer; and a plate-shaped elastic member bonded to the piezoelectric element, wherein the vibrating body drives a body to be driven, which is in contact with the plate-shaped elastic member, by a vibration generated in the plate-shaped elastic member through an application of a drive voltage to the piezoelectric element, and the plate-shaped elastic member has a front surface and a back surface each provided with one or a plurality of the piezoelectric elements to generate at least two different vibration modes through the application of the drive voltage to the one or the plurality of the piezoelectric elements.

Further, the present invention provides a vibratory drive unit including the above-mentioned vibrating body for a vibratory drive unit as a drive power source.

According to the present invention, it is possible to realize the vibrating body for a vibratory drive unit and the vibratory drive unit, which are capable of being reduced in cost and downsized due to the plate-shaped configuration and suppressing vibration attenuation to enhance the vibration efficiency irrespective of the downsizing so as to generate a large output stably.

Further features of the present invention will become apparent from the following description of exemplary embodiments with reference to the attached drawings.

BRIEF DESCRIPTION OF THE DRAWINGS

FIG. 4A is a view illustrating the front surface of a configuration of a vibrating body according to Example 3 of the present invention.

FIG. 4B is a view illustrating the side surface of the configuration of the vibrating body according to Example 3 of the present invention.

FIG. 4C is a view illustrating the back surface of the configuration of the vibrating body according to Example 3 of the present invention.

FIG. 5A is a view illustrating the front surface of a configuration of a vibrating body according to Example 4 of the present invention.

FIG. 5B is a view illustrating the side surface of the configuration of the vibrating body according to Example 4 of the present invention.

FIG. 5C is a view illustrating the back surface of the configuration of the vibrating body according to Example 4 of the present invention.

FIG. 10A is a view illustrating a vibrating body in a linear vibration wave actuator of Japanese Patent Application Laid-Open No. 2009-124791 of the conventional example.

FIG. 10B is a view illustrating the vibrating body in the linear vibration wave actuator of Japanese Patent Application Laid-Open No. 2009-124791 of the conventional example.

FIG. 10C is a view illustrating the vibrating body in the linear vibration wave actuator of Japanese Patent Application Laid-Open No. 2009-124791 of the conventional example.

FIG. 11A is a view illustrating a piezoelectric member, an elastic member, and a rotary member of a conventional ring-shaped ultrasonic motor.

FIG. 11B is a view illustrating the piezoelectric member, the elastic member, and the rotary member of the conventional ring-shaped ultrasonic motor.

DESCRIPTION OF THE EMBODIMENTS

Figure 1A:
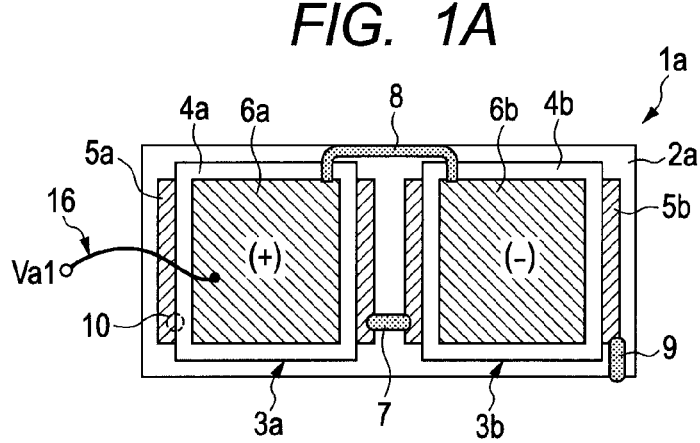
FIG. 1A is a view illustrating the front surface of a configuration example of a vibrating body for a vibratory drive unit according to Example 1 of the present invention.
Figure 1B:
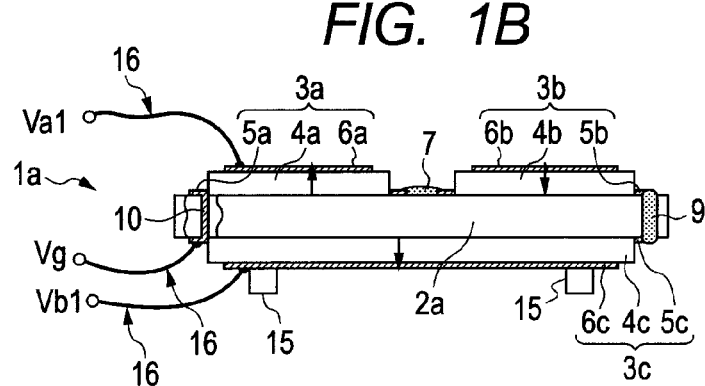
FIG. 1B is a view illustrating one side surface of the configuration example of the vibrating body for a vibratory drive unit according to Example 1 of the present invention.
Figure 1D:
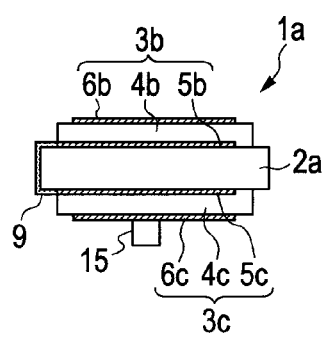
FIG. 1D is a view illustrating the other side surface of the configuration example of the vibrating body for a vibratory drive unit according to Example 1 of the present invention.
Figure 1C:
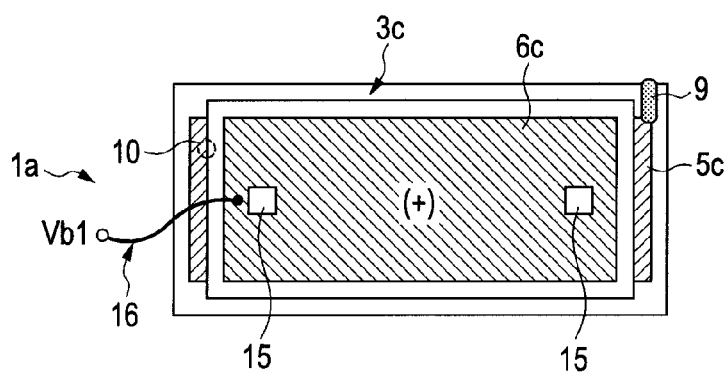
FIG. 1C is a view illustrating the back surface of the configuration example of the vibrating body for a vibratory drive unit according to Example 1 of the present invention.
Figure 2A:
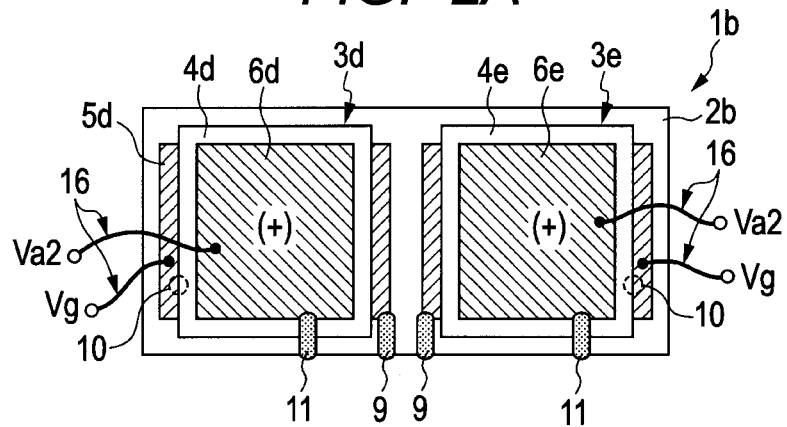
FIG. 2A is a view illustrating the front surface of a configuration of a vibrating body according to Example 2 of the present invention.
Figure 2B:
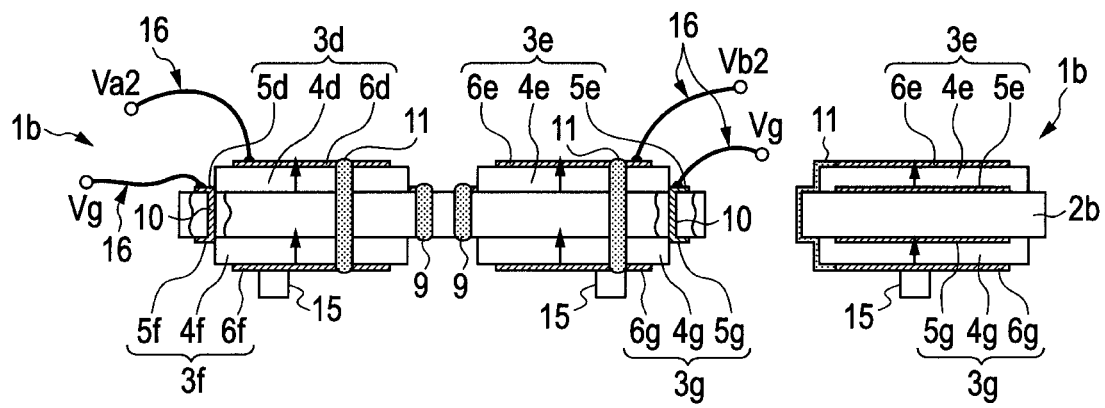
FIG. 2B is a view illustrating one side surface of the configuration of the vibrating body according to Example 2 of the present invention.
Figure 2D:
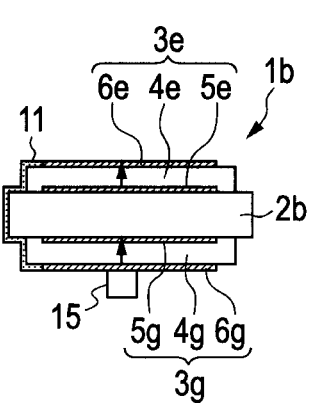
FIG. 2D is a view illustrating the other side surface of the configuration of the vibrating body according to Example 2 of the present invention.
Figure 2C:
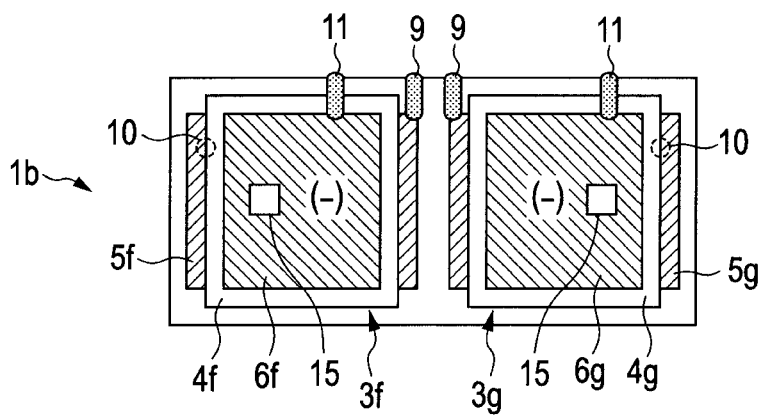
FIG. 2C is a view illustrating the back surface of the configuration of the vibrating body according to Example 2 of the present invention.

Preferred embodiments of the present invention will now be described in detail in accordance with the accompanying drawings.

EXAMPLES

Example 1

As Example 1 of the present invention, a configuration example of a vibrating body for a vibratory drive unit to which the present invention is applied is described.

The vibrating body for a vibratory drive unit of this example includes a piezoelectric element having a piezoelectric layer and an electrode layer, and a plate-shaped elastic member that is connected to the piezoelectric element and is provided with contact portions (protrusions), as described below.

Then, as described in the conventional example, a vibration generated through the application of a drive voltage to the piezoelectric element generates an elliptic motion in the contact portion of the elastic member to drive a body to be driven, which is in contact with the contact portions of the elastic member, with the elliptic motion.

FIGS. 1A to 1D are views respectively illustrating the front surface (upper surface), one side surface (first side surface), the back surface (lower surface), and the other side surface (second side surface) of the vibrating body of this example.

A vibrating body $1a$ illustrated in FIGS. 1A to 1D is assumed to be applied to a linear vibration wave actuator.

The vibrating body $1a$ includes a plate-shaped elastic member $2a$, two piezoelectric elements 3 (specifically, piezoelectric elements $3a$ and $3b$) formed on the front surface, and one piezoelectric element 3 (specifically, a piezoelectric element $3c$) formed on the back surface.

The elastic member $2a$ is bonded (fixed) to and integrated with the piezoelectric elements $3a$, $3b$, and $3c$ by simultaneous calcination as described later.

Specifically, the piezoelectric elements $3a$, $3b$, and $3c$ functioning as vibration energy generators and the elastic member $2a$ to be vibrated are fixed to and integrated with each other without using an adhesive layer of an adhesive.

To the piezoelectric elements $3a$ and $3b$ on the front surface and the piezoelectric element $3c$ on the back surface, electrode layers $5a$ and $6a$, electrode layers $5b$ and $6b$, and electrode layers $5c$ and $6c$ are formed via piezoelectric layers $4a$, $4b$, and $4c$, respectively.

Thus, unlike an elastic member of the conventional example, in the vibrating body of this example, the piezoelectric elements 3 are formed on the front surface and the back surface of the elastic member $2a$, respectively, instead of being formed only on one surface of the elastic member $2a$. This not only prevents the elastic member $2a$ from being warped but also increases the area of the piezoelectric elements 3 to enhance the output of the vibrating body.

Next, a method of producing the vibrating body $1a$ is described.

First, a plate-shaped calcined ceramics is ground and cut to predetermined dimensions to obtain the elastic member $2a$. Then, a conductive material paste capable of forming a thick film, which is prepared by mixing conductive material powder containing silver and palladium as its main components and an organic vehicle formed of an organic solvent and an organic binder, is coated onto the front surface of the elastic member $2a$ by using a thick film printing method by a screen printing machine.

The conductive material paste thus coated is heated at about 150° C. for about 10 minutes to remove the organic solvent therefrom, and thus dried to form the electrode layers $5a$ and $5b$ simultaneously.

Next, a piezoelectric material paste capable of forming a thick film, which is prepared by mixing piezoelectric material powder and an organic vehicle formed of an organic solvent and an organic binder, is printed onto the upper surfaces of the electrode layers $5a$ and $5b$ so as to cover a part of the electrode layers $5a$ and $5b$ by a screen printing machine.

Similarly, the piezoelectric material paste thus coated is heated at 150° C. for about 10 minutes and thus dried to form the piezoelectric layers $4a$ and $4b$.

The electrode layers $6a$ and $6b$ are formed by coating the above-mentioned conductive material paste onto the upper surfaces of the piezoelectric layers $4a$ and $4b$ and heating the coated paste to remove the organic solvent therefrom and dry the paste by a screen printing machine in the same way as in the electrode layers $5a$ and $5b$.

Next, on the back surface, the electrode layer $5c$, the piezoelectric layer $4c$, and the electrode layer $6c$ are formed successively by repeating coating and drying in the same way as in the front surface.

As a piezoelectric material for forming the piezoelectric layer 4, three-component system or multicomponent system piezoelectric material powder was used, which was obtained by adding a small amount of a compound made of multiple metal elements to lead zirconate and lead titanate ($PbZrO_3$—$PbTiO_3$) having a perovskite crystal structure as its main components followed by solid solution.

As the conductive material paste for forming the electrode layers 5 and 6, a conductive material with 10% by weight of piezoelectric material powder previously added thereto was used.

Note that, the piezoelectric material powder to be added may contain the same components as those of the piezoelectric layer 4 or may be lead zirconate and lead titanate ($PbZrO_3$—$PbTiO_3$) having the same main components. The piezoelectric powder was mixed with the electrode layers 5 and 6 in advance, to thereby prevent shrinkage due to calcination of the conductive material powder so as to reduce a peeling force.

Further, the contact portions of the piezoelectric powder containing substantially the same components mixed respectively with the piezoelectric layer 4 and the electrode layers 5 and 6 were caused to react with each other so that the piezoelectric layer 4 and the electrode layers 5 and 6 were bound strongly to each other.

The piezoelectric element 3 formed of the multiple piezoelectric layers 4 and the electrode layers 5 and 6 on the elastic member $2a$ thus formed has not been calcined yet. The piezoelectric element 3 was heated at 200° C. to 500° C. in an electric furnace to remove the organic binder therefrom, and thereafter calcined at 1,100° C. to 1,200° C. in a lead atmosphere.

As a result, the piezoelectric layers 4, the electrode layers 5 and 6, and the elastic member $2a$ were calcined simultaneously to be integrated, and the production of the piezoelectric element 3 and the bonding (fixing) between the piezoelectric element 3 and the elastic member $2a$ were conducted simultaneously. If required, as described in Japanese Patent Application Laid-Open No. 2009-124791, a piezoelectric layer (piezoelectric layer 83 of FIGS. 10A to 10C) made of a piezoelectric material may be formed so as to bond the elastic member 2 to the electrode layer 5 because silver and palladium as conductive materials for forming the electrode layer 5 have a weak bonding force with respect to the elastic member 2.

On the other hand, it is preferred that the material for the elastic member $2a$ as a vibrating body have such properties that an abnormal chemical reaction is not effected and a brittle compound is not generated even after calcination.

In this respect, the material for the elastic member 2 is most preferably a ceramics containing substantially the same main components as those of the piezoelectric layer 4.

This is because, if the material for the elastic member $2a$ is a piezoelectric ceramics containing substantially the same main components as those of the piezoelectric layer 4, the binding force required to bind the elastic member $2a$ to the piezoelectric layer 4 is obtained easily.

Specifically, if the respective crystal particles forming the calcined ceramics are substantially the same components as the respective uncalcined fine crystal particles forming the piezoelectric layer, the uncalcined piezoelectric layer can be bound easily during calcination to the crystal particles constituting the calcined ceramics while the crystal particles are growing.

Note that, although the piezoelectric ceramics has less vibration attenuation and is practicable as an elastic member, the piezoelectric ceramics is a relatively brittle material and has relatively weak mechanical strength.

Even when alumina, which is generally used most frequently of the ceramics and easily obtained at low cost and which has a property of less attenuation of vibration, was used as the elastic member 2a, the elastic member 2a and the piezoelectric layer were bound to each other satisfactorily.

This is because the elements constituting the piezoelectric layer spread to alumina to effect a stable chemical binding easily only in a region of alumina close to the piezoelectric layer.

Note that, the respective electrode layers 5 and 6 may be brought into conduction by conductive wires.

However, the front and back surfaces and the side surface of the elastic member 2a, and the surface of the piezoelectric layer have electrical insulation in this example.

Then, as illustrated in FIGS. 1A to 1D, the electrode layers 5a and 5b are brought into conduction by a conductive material (outer electrode) 7, and the electrode layers 6a and 6c are brought into conduction by a conductive material (outer electrode) 8.

Further, the electrode layers 5a and 5b and the electrode layer 5c are brought into conduction by a conductive material (outer electrode) 9.

Further, instead of using the conductive material (outer electrode) 9, the electrode layers 5a and 5b and the electrode layer 5c may be brought into conduction by a through-hole 10 in which a hole passing through the inside of the elastic member 2a is filled with a conductive material. In FIGS. 1A to 1D, the through-hole 10 is illustrated in a cross-sectional view of a part of the elastic member 2a.

The conductive materials (outer electrodes) may be formed prior to calcination or may be formed after polarization (described later) after calcination. Considering the polarity of polarization required in each piezoelectric element 3 or other factors, a procedure with a minimized labor should be used.

In this example, considering the polarization, the conductive materials 7 and 9 (or the through-hole 10) were brought into conduction by being previously coated with a conductive material paste prior to calcination and sintered during calcination.

Further, the conductive material 8 was brought into conduction with a conductive paste containing an adhesive, which was cured by heating at several tens of degrees C. to 120-130° C., after the polarization as the final step.

As described above, the piezoelectric layer 4, the electrode layer 5, the electrode layer 6, and the ceramics substrate (elastic member 2a) were simultaneously calcined to be integrated, and thereafter, a voltage was applied across the electrode layers 5 and 6, using, for example, a contact pin to polarize the piezoelectric layer 4.

The polarization was conducted by applying a predetermined voltage of about 35 V (corresponding to 3 KV/mm) across the electrode layers 5 and 6 in insulating oil at 120° C. to 150° C. for about 30 minutes.

In this example, the polarization directions of the piezoelectric layers 4a and 4b are set to be different from each other as indicated by (+), (−), and arrows in FIGS. 1A to 1D.

In this example, the elastic member 2a has a length of 12 mm, a width of 5 mm, and a thickness of 0.3 mm, the piezoelectric layer 4 has a thickness of about 12 μm, and the electrode layers 5 and 6 have a thickness of about 5 μm.

In FIGS. 1A to 1D, the electrode layer 5 of each piezoelectric element 3 is brought into conduction by a conductive material (with the common ground) so as to perform polarization easily.

However, depending upon a terminal for driving the vibrating body 1a, the vibrating body 1a may be driven in a manner that the electrode layer 5 of each piezoelectric element 3 is brought into conduction with an outer power source while being electrically independent. In FIGS. 1A to 1D, an AC voltage close to an appropriate resonant frequency is applied to a terminal Va1 brought into conduction with the electrode layers 6a and 6b on the front surface by using a conductive wire 16, with a terminal Vg serving as the ground and being brought into conduction with the electrode layers 5a and 5b by using the conductive wire 16.

Figure 9A:
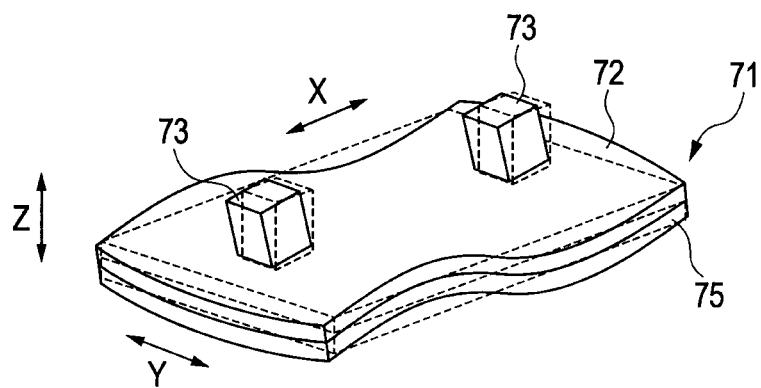
FIG. 9A is a view illustrating a vibration mode of the linear vibration wave actuator of Japanese Patent Application Laid-Open No. 2004-304887 of the conventional example.

Here, the polarity of polarization of the piezoelectric layer 4a of the piezoelectric element 3a is different from that of the piezoelectric layer 4b of the piezoelectric element 3b, and hence a secondary bending vibration in the long-side direction occurs in the vibrating body 1a in the same way as in the vibrating body 71 of the conventional example of FIG. 9A.

Further, a vibration can be generated by applying an AC voltage to a terminal Vb1 brought into conduction with the electrode layer 6c of the piezoelectric element 3c on the back surface by using the conductive wire 16 as follows, with the terminal Vg serving as the ground and brought into conduction with the electrode layer 5c by using the conductive wire 16.

Figure 9B:
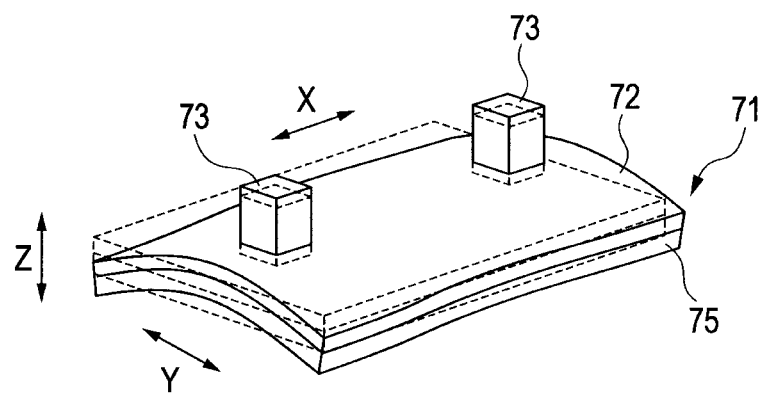
FIG. 9B is a view illustrating another vibration mode of the linear vibration wave actuator of Japanese Patent Application Laid-Open No. 2004-304887 of the conventional example.

That is, when an AC voltage close to an appropriate resonant frequency is applied, a primary bending vibration in the short-side direction can be generated in the vibrating body 1a in the same way as in the vibrating body 71 of the conventional example of FIG. 9B.

Thus, by adjusting voltages to be applied to the piezoelectric layer on the front surface side of the vibrating body and the piezoelectric layer on the back surface side thereof, at least two vibration modes can be generated, which are different between the piezoelectric layer (piezoelectric element) on the front surface side and the piezoelectric layer (piezoelectric element) on the back surface side, and by combining the vibrations, a predetermined vibration can be generated in the vibrating body.

Here, the resonant frequency of the secondary bending vibration in the long-side direction is previously substantially matched with the resonant frequency of the primary bending vibration in the short-side direction, and the AC voltages of the terminals Va1 and Vb1 are set to be the same frequency with a phase difference by 90°. This generates an elliptic motion in two protrusions 15 provided in the vibrating body 1a. Consequently, as illustrated in FIG. 3, the vibrating body 1a can drive a linear slider 14 that is a body to be driven.

Figure 3:
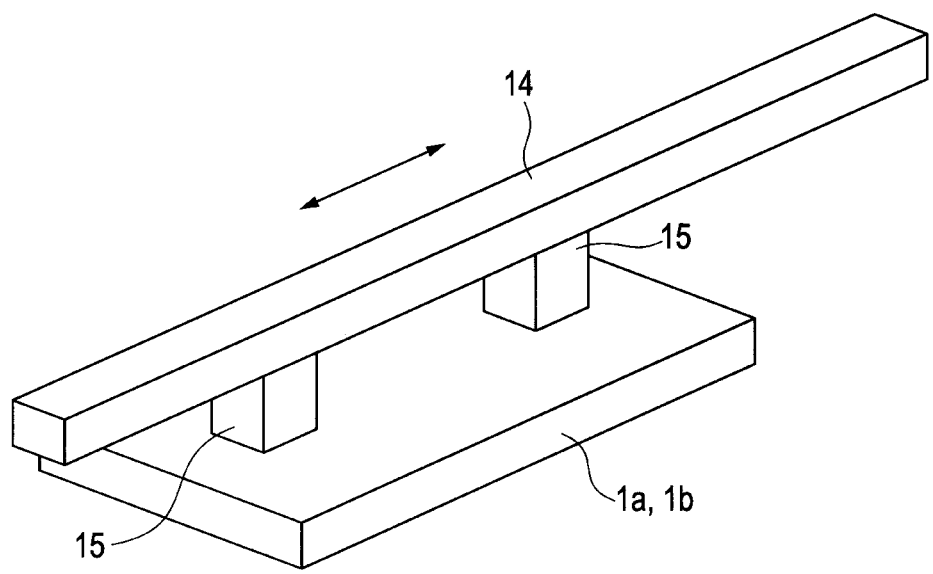
FIG. 3 is a view illustrating a drive mechanism of a linear vibration wave actuator incorporating the vibrating body according to Example 1 or 2 of the present invention.

FIG. 3 is a view illustrating the configuration of a linear vibration wave actuator incorporating the vibrating body 1a according to Example 1. The principle of the linear drive is the same as that of the conventional example. The linear slider 14 is in pressure contact with the protrusions 15 and the linear slider 14 reciprocates due to the elliptic motion excited in the protrusions 15 by the vibration of the vibrating body 1a.

Note that, a part of the piezoelectric element 3c is removed after the completion of the polarization so that the protrusions 15 in a column shape are bonded to the elastic member 2a.

Further, a piezoelectric material paste and a conductive material paste for forming the piezoelectric layer 4 and the electrode layers 5 and 6 were prepared as follows. That is, a small amount of additives were added to piezoelectric material powder or conductive material powder, and the resultant powder and an organic vehicle using an organic binder such as ethyl cellulose and an organic solvent such as terpineol were kneaded with three rolls.

In this example, although the thickness of the piezoelectric layer 4 is set to be 12 μm, a piezoelectric layer or an electrode layer with a large thickness such as about 2-3 μm to about 30 μm can be formed precisely according to a screen printing method. Further, it is also easy to provide an electrode divided by a plate according to the screen printing method.

In this example, although one piezoelectric layer 4 is formed on each of the front and back surfaces, at least two piezoelectric layers 4 may be laminated. The lamination enables a vibrating body to generate a larger output.

In a thick film printing method according to the screen printing method, a thin layer with high precision can be formed easily and a coating position can be controlled with high precision, which make it unnecessary to perform machining after sintering.

Further, compared with a conventional method of producing a piezoelectric ceramics, the yields of a piezoelectric material and an electrode material are satisfactory, and the production facility is inexpensive. As a result, the production cost of the vibrating body can also be reduced.

According to the above-mentioned configuration, a downsized vibrating body can be obtained, which is capable of easily generating large vibration energy stably with a satisfactory vibration efficiency and has a small fluctuation in performance and which can be applied to the development of a future low-cost, downsized, high-output vibratory drive unit of various types.

Further, warpage deformation after calcination can be eliminated owing to the integration of the production of a piezoelectric element and the calcination (bonding) with respect to an elastic member, and machining after the calcination is not required, which enable a vibrating body to be produced at lower production cost.

Then, a vibratory drive unit can be realized, which is configured using such vibrating body for a vibratory drive unit as a vibration power source.

Example 2

As Example 2 of the present invention, a configuration example of a vibrating body for a vibratory drive unit having a different form from that of Example 1 is described with reference to FIGS. 2A to 2D.

FIGS. 2A to 2D are views respectively illustrating the front surface, one side surface, the back surface, and the other side surface of the vibrating body.

A vibrating body 1b illustrated in FIGS. 2A to 2D is assumed to be applied to a linear vibration wave actuator.

The vibrating body 1b includes two piezoelectric elements 3 on each of the front and back surfaces of a plate-shaped elastic member 2b.

The elastic member 2b is bonded (fixed) to and integrated with the piezoelectric elements 3 by simultaneous calcination as described later in the same way as in Example 1.

Specifically, the piezoelectric elements 3 functioning as vibration energy generators and the elastic member 2b to be vibrated are fixed to and integrated with each other without using an adhesive layer.

The vibrating body 1b includes two piezoelectric elements 3d and 3e (first piezoelectric element and second piezoelectric element provided in parallel to the first piezoelectric element) on the front surface as the piezoelectric element 3, and two piezoelectric elements 3f and 3g which are opposed to the piezoelectric elements 3d and 3e on the back surface.

On the respective piezoelectric elements 3d, 3e, 3f, and 3g, electrode layers 5d and 6d, electrode layers 5e and 6e, electrode layers 5f and 6f, and electrode layers 5g and 6g are formed via piezoelectric layers 4d, 4e, 4f, and 4g.

By forming piezoelectric elements on both the front and back surfaces, instead of forming the piezoelectric elements only on one surface of an elastic member as in the conventional example, the warpage of the elastic member can be prevented, and the area of the piezoelectric elements and the output of the vibrating body can be increased.

Here, each electrode layer may be brought into conduction by a conductive wire, but in this example, as illustrated in FIGS. 2A to 2D, the electrode layer 5d of the piezoelectric element 3d on the front surface and the opposed electrode layer 5f of the piezoelectric element 3f on the back surface are brought into conduction by a conductive material (outer electrode) 9.

Further, the electrode layer 6d of the piezoelectric element 3d and the opposed electrode layer 6f of the piezoelectric element 3f on the back surface are also brought into conduction by a conductive material (outer electrode) 11. The conductive materials (outer electrodes) may be formed before calcination or may be formed after polarization after the calcination. Considering the polarization direction required in each piezoelectric element, a procedure with a minimized labor should be used.

In this example, the conductive materials 9 and 11 can be brought into conduction by coating a conductive material paste previously before calcination and sintered the paste during calcination.

Further, as described in Example 1, instead of using the conductive material 9, the electrode layers 5d and 5f may be brought into conduction by a through-hole 10. In FIGS. 2A to 2D, the through-hole 10 is illustrated in a cross-sectional view of a part of the elastic member 2b.

Here, the polarization directions of the piezoelectric layer 4d of the piezoelectric element 3d and the opposed piezoelectric layer 4f of the piezoelectric element 3f on the back surface are opposite to each other when viewed from the electrode layers 5d and 5f, as the polarity of polarization indicated by (+), (−), and arrows in FIGS. 2A to 2D.

That is, by setting the piezoelectric element 3d on the front surface and the opposed piezoelectric element 3f on the back surface as a unit and applying a voltage to the electrode layers 6d and 6f, with the electrode layers 5d and 5f serving as the ground, conduction is performed as follows.

That is, the piezoelectric element 3d on the front surface and the opposed piezoelectric element 3f on the back surface are designed so as to be brought into conduction by an outer electrode or a through-hole so that the expansion and contraction directions in a plane direction of the elastic body become opposite.

Similarly, the electrode layer 5e of the piezoelectric element 3e on the front surface and the opposed electrode layer 5g of the piezoelectric element 3g on the back surface are designed so as to be brought into conduction by the conductive material (outer electrode) 9 (or the through-hole 10).

Further, the electrode layer 6e of the piezoelectric element 3e and the electrode layer 6g of the opposed piezoelectric element 3g on the back surface are designed so as to be brought into conduction by the conductive material (outer electrode) 11.

Here, the polarization directions of the piezoelectric element 3e and the opposed piezoelectric element 3g on the back surface are opposite to each other when viewed from the electrode layers 5e and 5g, as the polarity of polarization indicated by (+), (−), and arrows in FIGS. 2A to 2D.

Here, by setting the piezoelectric element 3e on the front surface and the opposed piezoelectric element 3g on the back surface as a unit and applying a voltage to the electrode layers 6e and 6g with the electrode layers 5e and 5g serving as the ground, conduction is performed as follows.

That is, the piezoelectric element 3e on the front surface and the opposed piezoelectric element 3g on the back surface are designed so as to be brought into conduction by an outer electrode or a through-hole so that the expansion and contraction directions in a plane direction of the elastic body become opposite.

In FIGS. 2A to 2D, when AC voltages close to an appropriate resonant frequency with phases different by 180° are applied to terminals Va2 and Vb2, with the terminal Vg serving as the ground, the expansion and contraction of the piezoelectric elements 3d and 3e become opposite. Along with this, the expansion and contraction of the piezoelectric element 3f opposed to the piezoelectric element 3d and the piezoelectric element 3g opposed to the piezoelectric element 3e also become opposite.

As a result, out-of-plane bending directions become opposite between one left-side portion of the elastic member 2b in which the piezoelectric elements 3d and 3f are present and one right-side portion of the elastic member 2b in which the piezoelectric elements 3e and 3g are present. Then, in the same way as in the vibrating body 71 of the conventional example of FIG. 9A, a secondary bending vibration in a long-side direction occurs in the vibrating body 1b.

Further, when AC voltages close to an appropriate resonant frequency with the same phase are applied to the terminals Va2 and Vb2, with the terminal Vg serving as the ground, the expansion and contraction of the piezoelectric elements 3d and 3e become the same. Along with this, the expansion and contraction of the piezoelectric elements 3f and 3g become opposite to that of the piezoelectric elements 3d and 3e.

As a result, the out-of-plane bending directions become the same between the one left-side portion of the elastic member 2b in which the piezoelectric elements 3d and 3f are present and one right-side portion of the elastic member 2b in which the piezoelectric elements 3e and 3g are present. Thus, in the same way as in the vibrating body of the conventional example of FIG. 9B, a primary bending vibration in a short-side direction can be generated in the vibrating body 1b.

That is, as described in Japanese Patent Application Laid-Open No. 2009-124791, when the levels of the voltages of the terminals Va2 and Vb2 are set to be the same, and the phase difference between the terminals Va2 and Vb2 is set to be other than 0° and 180°, a secondary bending vibration in a long-side direction and a primary bending vibration in a short-side direction can be generated simultaneously, and the amplitudes of two vibrations can be changed by the phase difference.

FIG. 3 is a view illustrating the configuration of a linear vibration wave actuator incorporating the vibrating body 1b according to Example 2. The principle of linear drive is the same as that of the conventional example.

A linear slider 14 is in pressure contact with protrusions 15 and the linear slider 14 reciprocates due to the elliptic motion excited in the protrusions 15 by the vibration of the vibrating body 1b caused by the AC voltages applied to the terminals Vat and Vb2 as described above.

A method of producing the vibrating body 1b is basically the same as that of the vibrating body 1a of Example 1, and the dimension of the elastic member 2, and the thicknesses of the piezoelectric layer 4 and the electrode layers 5 and 6 are the same as those of Example 1.

Note that, in the present invention, the electrode layers and the outer power source are brought into conduction by using the conductive wire 16 in Examples 1 and 2, but instead of using the conductive wire, the electrode layers and the outer power source may be brought into conduction via a flexible circuit board.

Example 3

As Example 3 of the present invention, a configuration example of a vibrating body for a vibratory drive unit having a different form from that of Example 1 is described with reference to FIGS. 4A to 4C.

FIGS. 4A to 4C respectively illustrate a front surface, a side surface, and a back surface of a vibrating body 1c of this example.

The vibrating body 1c illustrated in FIGS. 4A to 4C can be used for a ring-shaped ultrasonic motor. Two piezoelectric elements and one piezoelectric element are provided respectively on the front and back surfaces in Example 1, but in this example, a number of piezoelectric elements are provided respectively on the front and back surfaces so that different vibrations are generated by the piezoelectric elements on the front and back surfaces.

Here, FIGS. 11A and 11B illustrate the configurations of a piezoelectric member, an elastic member, and a rotary member of a ring-shaped ultrasonic motor of the conventional example described, for example, in Japanese Patent Publication No. H01-017354 and Japanese Patent Application Laid-Open No. S61-191277, etc.

FIG. 11B illustrates a ring-shaped metal body (stator) 90 in which a ring-shaped rotor 91 is brought into pressure contact with one surface thereof and a piezoelectric member 92 is adhered to the other surface thereof.

FIG. 11A is a front view of FIG. 11B, illustrating the arrangement of electrode layers of the piezoelectric member.

The ultrasonic motor generates a progressive wave based on the bending vibration wave in the ring-shaped elastic member 90 made of metal by the piezoelectric member 92 to friction drive the rotor 91.

As illustrated in FIG. 11A, the piezoelectric member 92 is provided with electrodes 93 with a length of ½ of a wavelength λ of the progressive wave. Further, the polarities of polarization of the adjacent electrodes 93 are different (i.e., (+) and (−)), and two electrode groups (A-phase and B-phase) shifted by a length of ¼ of the wavelength λ (having a phase difference in terms of a position) are provided.

Then, two AC voltages close to a resonant frequency determined by the wavelength and close to a resonant frequency shifted by a length of ¼ of the wavelength λ (i.e., 90° phase) are respectively applied to electrode terminals a and b. As a result, the piezoelectric member 92 is excited to form a progressive wave on the surface of the ring-shaped elastic member 90 made of metal.

The vibrating body 1c of this example has a function replacing the piezoelectric member 92 of the above-mentioned conventional ultrasonic motor, and as illustrated in FIGS. 4A to 4C, the vibrating body 1c includes a ring-shaped and plate-shaped elastic member 2b and a number of piezoelectric elements 31 with a length of ½ of the wavelength λ of a progressive wave placed on the front and back surfaces of the elastic member 2b.

The elastic member 2b and the piezoelectric elements 31 are bonded (fixed) to and integrated with each other without using an adhesive layer, by simultaneous calcination in the same way as in Examples 1 and 2.

The configuration of the vibrating body of this example is described with reference to FIGS. 4A to 4C.

In FIGS. 4A to 4C, the piezoelectric elements 31 include a piezoelectric element 31*h* group including a piezoelectric element 31*h*1, piezoelectric elements 31*h*2 to 31*h*8 on the front surface, and a piezoelectric element 31*i* group including a piezoelectric element 31*i*1, piezoelectric elements 31*i*2 to 31*i*8 on the back surface.

In the piezoelectric element 31*h* group on the front surface, there are formed a common electrode layer 51*h* for the respective piezoelectric elements, a piezoelectric layer 41*h*1, piezoelectric layers 41*h*2 to 41*h*8, an electrode layer 61*h*1, and electrode layers 61*h*2 to 61*h*8.

Further, in the piezoelectric element 31*i* group on the back surface, there are formed a common electrode layer 51*i* for the respective piezoelectric elements, a piezoelectric layer 41*i*1, piezoelectric layers 41*i*2 to 41*i*8, an electrode layer 61*i*1, and electrode layers 61*i*2 to 61*i*8.

Note that, the polarity of polarization is indicated by (+), (−), and arrows. The piezoelectric layers 41 are illustrated only in a side view of FIG. 4B.

Here, the piezoelectric element 31*h* group on the front surface and the piezoelectric element 31*i* group on the back surface are formed so as to be shifted by a length of ¼ of the wavelength $\lambda$ in a circumferential direction of the elastic member 2*b*.

This is the same positional relationship as that of the two electrode groups in the piezoelectric member 92 of the conventional example. This example has a feature that the two piezoelectric element groups 31*h* group and 31*i* group each include a number of piezoelectric elements formed on the front and back surfaces of the ring-shaped and plate-shaped elastic member 2*b*.

The piezoelectric element groups 31*h* group and 31*i* group correspond to the A-phase and the B-phase of the conventional example of FIG. 11A.

Each electrode layer may be brought into conduction by a conductive wire. In this example, as illustrated in FIGS. 4A to 4C, the common electrode layer 51*h* of the piezoelectric element 31*h* group on the front surface and the common electrode layer 51*i* of the piezoelectric element 31*i* group on the back surface are formed during calcination by coating a conductive material paste as a conductive material 22 before the calcination.

Further, after the calcination and polarization, in the piezoelectric element 31*h* group, a conductive material 23 connecting the electrode layer 61*h*1, the electrode layers 61*h*2 to 61*h*8 is provided by the above-mentioned conductive material paste to be cured by heating, and in the piezoelectric element 31*i* group, a conductive material 24 connecting the electrode layer 61*i*1, the electrode layers 61*i*2 to 61*i*8 is provided by the above-mentioned conductive material paste to be cured by heating.

The vibrating body 1*c* is adhered to one surface of the ring-shaped metal body 90 as illustrated in FIG. 11B of the conventional example. Then, as illustrated in FIGS. 4A to 4C, the following AC voltages are applied to the piezoelectric element 31*h* group on the front surface, to which a terminal Va3 is connected by a conductive wire 16, and the piezoelectric element 31*i* group on the back surface, to which a terminal Vb3 is connected by the conductive wire 16, with a terminal Vg serving as the ground and being brought into conduction with the common electrode layers 51*h* and 51*i*.

Specifically, two AC voltages close to a resonant frequency determined by the wavelength, with the temporal phase shifted by 90°, are applied to the piezoelectric element 31*h* group on the front surface and the piezoelectric element 31*i* group on the back surface placed so as to be shifted by a length of ¼ of the wavelength $\lambda$ in the circumferential direction.

Thus, by adjusting voltages to be applied to the piezoelectric layers on the front surface side of the vibrating body and the piezoelectric layers on the back surface side thereof, at least two different forms of vibrations (with the temporal phase shifted by 90°), can be generated in the piezoelectric layers (piezoelectric elements) on the front surface side and the piezoelectric layers (piezoelectric elements) on the back surface side, and by combining the vibrations, a predetermined vibration can be generated in the vibrating body.

Consequently, the vibrating body 1*c* excites a progressive wave on one surface of the ring-shaped metal body 90 to rotate the ring-shaped rotor that is brought into pressure contact with the surface of the ring-shaped metal body 90.

A method of producing the vibrating body 1*c* is basically the same as that of the vibrating body 1*a* of Example 1. In this example, the elastic member 2*b* is made of alumina and has a diameter of 62 mm, an inner diameter of 54 mm, and a thickness of 0.5 mm; the piezoelectric layer 4 has a thickness of about 12 µm; and the electrode layers 5 and 6 each have a thickness of about 5 µm. The conductive material has a thickness of about 5 µm.

As described above, this example shows an example in which a number of piezoelectric elements are provided on each of the front and back surfaces so that two different vibration modes are generated in the piezoelectric elements on the front and back surfaces.

Further, for example, FIGS. 9A and 9B of Japanese Patent Application Laid-Open No. 2007-189802 illustrate an example in which three different vibration modes are generated from one piezoelectric element.

Specifically, in the electrode patterns of the piezoelectric element, the electrode patterns on an outer circumferential side are patterns of electrodes of an A-phase and a B-phase that are drive phases for out-of-plane tertiary vibration excitation, and the electrode pattern on an inner circumferential side is a pattern of an electrode of a C-phase that is a drive phase for in-plane vibration excitation.

Then, by applying voltages to the piezoelectric element, drive vibrations in an in-plane direction of an even order and in an out-of-plane direction of an odd order are formed.

According to this example, by providing piezoelectric element groups replacing the total three patterns of the A-phase electrode, the B-phase electrode, and the C-phase electrode on the front and back surfaces of the plate-shaped elastic member, three different vibration modes can be generated.

Example 4

As Example 4 of the present invention, a configuration example of a vibrating body for a vibratory drive unit having a different form from that of Examples above is described with reference to FIGS. 5A to 5C.

FIGS. 5A to 5C respectively illustrate a front surface, a side surface, and a back surface of a vibrating body.

A vibrating body 1*d* illustrated in FIGS. 5A to 5C can be used for the conventional ring-shaped ultrasonic motor of FIGS. 10A to 10C. Description of the ultrasonic motor is the same as that in Example 3.

In this example, a number of piezoelectric elements 31 are provided on each of the front and back surfaces of the elastic member 2*b* of the vibrating body 1*d*, and a progressive wave based on a bending vibration wave can be generated in the ring-shaped elastic member 90 made of metal by the opposed piezoelectric elements 31 on the front and back surfaces.

In the vibrating body 1d, electrodes of the opposed piezoelectric elements 31 on the front and back surfaces are brought into conduction in the same positional relationship as that of the two electrode groups in the piezoelectric member 92 of the conventional example of FIG. 11A, on the front and back surfaces of the ring-shaped and plate-shaped elastic member 2b.

The elastic member 2b and the piezoelectric elements 31 are bonded (fixed) to and integrated with each other without using an adhesive layer, by simultaneous calcination as described later.

In FIGS. 5A to 5C, the length of the piezoelectric element 31 is ½ of the wavelength λ. On the front surface, there are provided a piezoelectric element 31j group including piezoelectric elements 31j1, 31j2, and 31j3, and a piezoelectric element 31k group including piezoelectric elements 31k1, 31k2, and 31k3. In the piezoelectric element 31j group on the front surface, piezoelectric layers 41j1, 41j2, and 41j3 and electrode layers 61j1, 61j2, and 61j3 are formed on a common electrode layer 51j.

Further, in another piezoelectric element 31k group on the front surface, piezoelectric layers 41k1, 41k2, and 41k3 and electrode layers 61k1, 61k2, and 61k3 are formed on a common electrode layer 51k.

On the other hand, on the back surface of the elastic member 2b, a piezoelectric element 31m group including piezoelectric elements 31m1, 31m2, and 31m3 is provided so as to be opposed to the piezoelectric element 31j group. Further, a piezoelectric element 31L group including piezoelectric elements 31L1, 31L2, and 31L3 is provided so as to be opposed to the piezoelectric element 31k group.

Further, in the piezoelectric element 31m group on the back surface, piezoelectric layers 41m1, 41m2, and 41m3 and electrode layers 61m1, 61m2, and 61m3 are formed on a common electrode layer 51m.

Further, in another piezoelectric element 31L group on the back surface, piezoelectric layers 41L1, 41L2, and 41L3 and electrode layers 61L1, 61L2, and 61L3 are formed on a common electrode layer 51L.

Here, the piezoelectric element 31j group and 31k group, and the piezoelectric element 31m group and 31L group are respectively formed at positions shifted by a length of ¼ of the wavelength λ on the front and back surfaces of the ring-shaped and plate-shaped elastic member 2b.

Each electrode layer may be brought into conduction by a conductive wire. However, in this example, as illustrated in FIGS. 5A to 5C, the common electrode layer 51j for the piezoelectric element 31j group on the front surface and the common electrode layer 51k for the piezoelectric element 31m group on the back surface are brought into conduction by coating a conductive material paste as a conductive material 25 before calcination. Further, the common electrode layer 51k for the piezoelectric element 31k group on the front surface and the common electrode layer 51L for the piezoelectric element 31L group on the back surface are similarly brought into conduction by a conductive material 26.

Further, there are provided three conductive materials 27 connecting the electrode layers 61j1, 61j2, and 61j3 of the piezoelectric element 31j group to the electrode layers 61m1, 61m2, and 61m3 of the piezoelectric element 31m group, respectively, before calcination.

Similarly, there are provided three conductive materials 28 connecting the electrode layers 61k1, 61k2, and 61k3 of the piezoelectric element 31k group to the electrode layers 61L1, 61L2, and 61L3 of the piezoelectric element 31L group, respectively, before calcination.

The polarization directions of the piezoelectric layer 41j1 and the piezoelectric layer 41m1, the piezoelectric layer 41j2 and the piezoelectric layer 41m2, and the piezoelectric layer 41j3 and the electrode layer 41m3 of the piezoelectric element 31j group and the opposed piezoelectric element 31m group are respectively opposite to each other, when viewed from the electrode layers 51j and 51k that are common electrodes.

The polarization directions of the piezoelectric layer 41k1 and the piezoelectric layer 41L1, the piezoelectric layer 41k2 and the piezoelectric layer 41L2, and the piezoelectric layer 41k3 and the piezoelectric layer 41L3 of the piezoelectric element 31k group and the opposed piezoelectric element 31L group are respectively opposite to each other, when viewed from the electrode layers 51j and 51k that are common electrodes. Note that, the polarity of polarization is indicated by (+), (−), and arrows.

Further, a conductive material paste to be cured by heating is provided after polarization as a conductive material 29 connecting the electrode layers 61j1, 61j2, and 61j3, and as a conductive material 30 connecting the electrode layers 61k1, 61k2, and 61k3. Then, terminals Va4 and Vb4 connected to the conductive wire 16 are connected to an outer power source.

The vibrating body 1d is adhered to one surface of the ring-shaped metal body (stator) 90 illustrated in FIGS. 10A to 10C of the conventional example.

Then, in FIGS. 5A to 5C, the following two AC voltages are applied to the piezoelectric element 31j group on the front surface, to which the terminal Va4 is connected, and the piezoelectric element 31k group on the back surface, to which the terminal Vb4 is connected, with the terminal Vg serving as the ground and brought into conduction with the electrode layers 51j and 51k that are common electrodes.

Specifically, AC voltages with temporal phases different by 90° are applied to the piezoelectric element groups shifted by a length of ¼ of the wavelength λ (i.e., 90° phase) close to a resonant frequency determined by the wavelength λ. Thus, a progressive wave is excited in the vibrating body ld to rotate a ring-shaped rotor that is brought into pressure contact with the other surface of the metal body 90.

A method of producing the vibrating body ld is basically the same as that of the vibrating body 1a of Example 1.

In this example, the elastic member 2b is made of alumina and has a diameter of 62 mm, an inner diameter of 54 mm, and a thickness of 0.5 mm; the piezoelectric layer 4 has a thickness of about 12 μm; and the electrode layers 5 and 6 each have a thickness of about 5 μm. The conductive material has a thickness of about 5 μm.

Example 5

As Example 5 of the present invention, a configuration example of a vibrating body for a vibratory drive unit having a different form from that of Examples above is described with reference to FIGS. 6A to 6C.

Figure 6A:
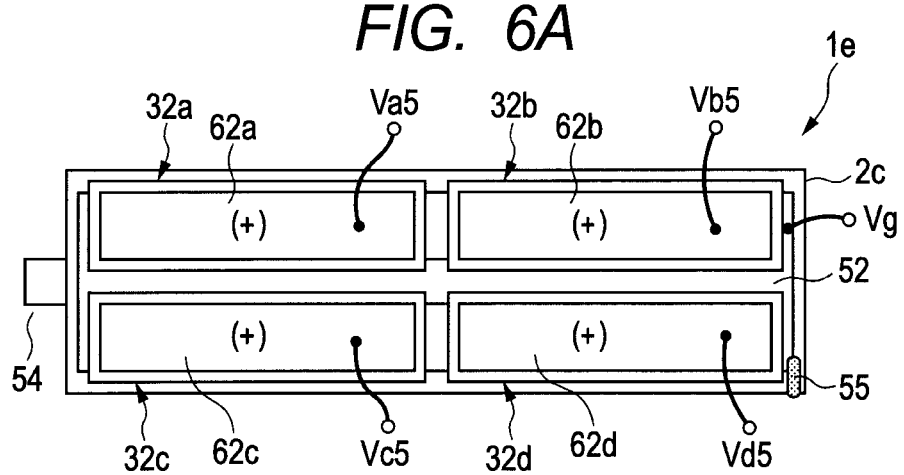
FIG. 6A is a view illustrating the front surface of a configuration of a vibrating body according to Example 5 of the present invention.
Figure 6B:
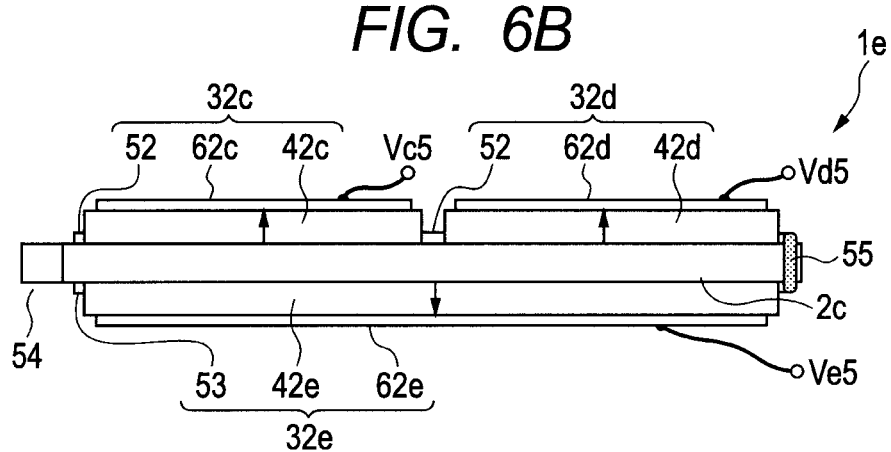
FIG. 6B is a view illustrating the side surface of the configuration of the vibrating body according to Example 5 of the present invention.
Figure 6C:
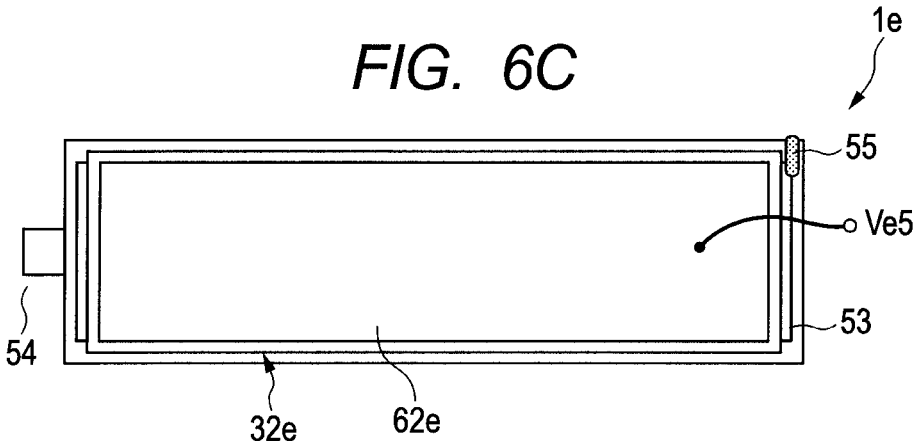
FIG. 6C is a view illustrating the back surface of the configuration of the vibrating body according to Example 5 of the present invention.

FIGS. 6A to 6C respectively illustrate a front surface, a side surface, and a back surface of a vibrating 1e.

The vibrating body 1e illustrated in FIGS. 6A to 6C can be used for a piezoelectric actuator described later.

In this example, four piezoelectric elements 32 are provided on the front surface and one piezoelectric element 32 is provided on the back surface. Then, three different vibrations are generated by the piezoelectric elements 32 on the front and back surfaces.

Figure 12A:
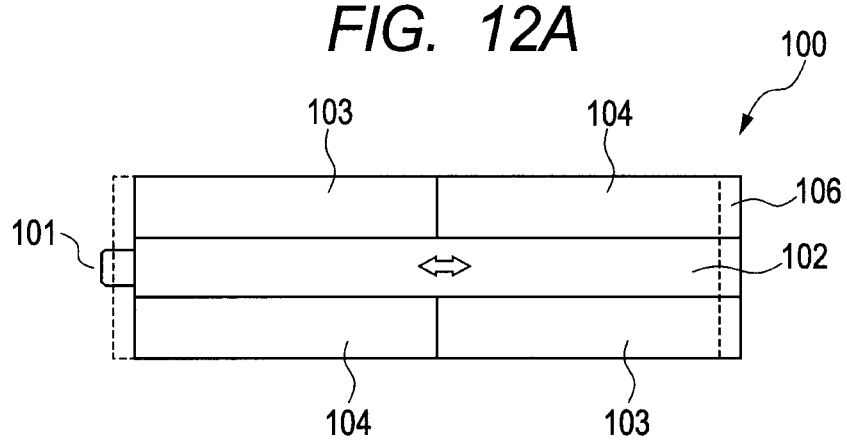
FIG. 12A is a view illustrating a conventional piezoelectric actuator.
Figure 12B:
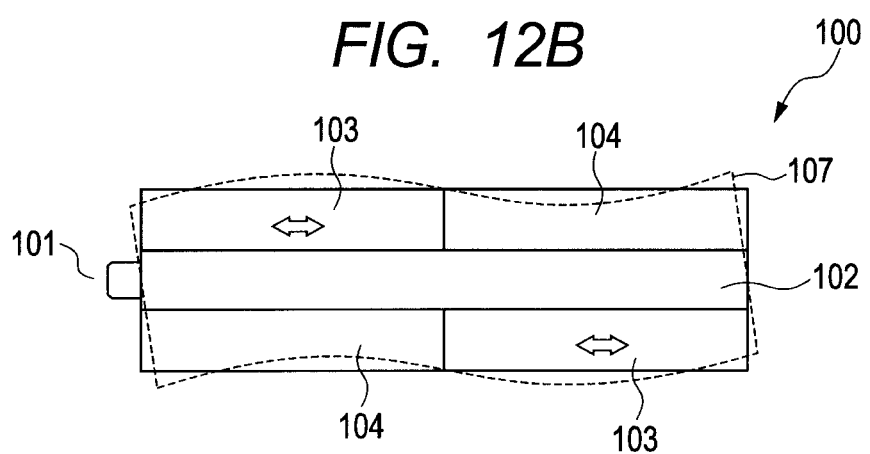
FIG. 12B is a view illustrating the conventional piezoelectric actuator.
Figure 12C:
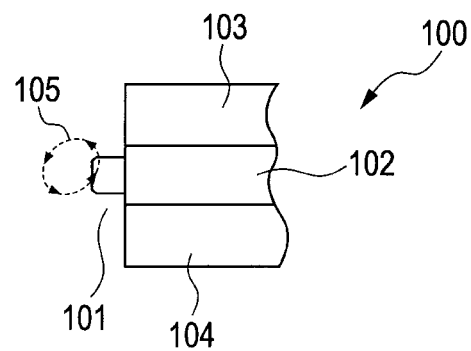
FIG. 12C is a view illustrating the conventional piezoelectric actuator.

As an example of the piezoelectric actuator, FIGS. 12A to 12C illustrate a piezoelectric element 100 of a piezoelectric actuator described in Japanese Patent Application Laid-Open No. 2004-254417 and No. 2007-330036.

In FIG. 12A, a vertical vibration of the piezoelectric element 100 of the piezoelectric actuator is illustrated by a dotted line. In FIG. 12B, a bending vibration is illustrated by a dotted line. In FIG. 12C, a locus 105 of an elliptic vibration of a protrusion 101 of the piezoelectric element 100 is illustrated by a dotted line.

The dimension of the piezoelectric element 100 is previously set so that the vertical vibration and the bending vibration are both close to a predetermined resonant frequency.

When AC voltages are applied to a center electrode 102 and two symmetric electrodes 103 of the piezoelectric element 100, as illustrated in FIG. 12A, the piezoelectric element 100 expands or contracts in a long-side direction mainly by the center electrode 102 (excites a so-called vertical vibration 106).

Further, voltages are also applied to the symmetric electrodes 103, both sides of the piezoelectric element 100 expand or contract asymmetrically and, as illustrated in FIG. 12B, are bent symmetrically about a point with respect to a plane center of the piezoelectric element 100 in a direction orthogonal to the vertical vibration 106 (excites a so-called bending vibration 107).

Due to the simultaneous occurrence of the vertical vibration 106 and the bending vibration 107, the protrusion 101 of the piezoelectric element 100 vibrates while drawing an elliptic locus 105 as illustrated in FIG. 12C. The protrusion 101 can move a body to be driven (not shown) by pressing the body to be driven in a part of the elliptic locus 105.

Meanwhile, in the case of moving the body to be driven in an opposite direction, voltages with a predetermined frequency are applied to the center electrode 102 and symmetric electrodes 104 of the piezoelectric element 100.

Consequently, another bending vibration different from the bending vibration 107 is generated, and the protrusion 101 vibrates while drawing an elliptic locus (not shown) in an opposite direction to that of the elliptic locus 105. This enables the body to be driven to move in the opposite direction.

The vibrating body 1e illustrated in FIGS. 6A to 6C of this example has a function replacing the piezoelectric element 100 of the above-mentioned piezoelectric actuator, and includes a plate-shaped elastic member 2c and the piezoelectric elements 32 on the front and back surfaces of the elastic member 2c. The elastic member 2c and the piezoelectric elements 32 are bonded (fixed) to and integrated with each other without using an adhesive layer, by simultaneous calcination as described later.

The vibrating body 1e illustrated in FIGS. 6A to 6C includes the plate-shaped elastic member 2c having a protrusion 54, four piezoelectric elements 32a, 32b, 32c, and 32d provided on the front surface of the elastic member 2c, and one piezoelectric element 32e provided on the back surface of the elastic member 2c.

Then, there are formed a common electrode layer 52 for the four piezoelectric elements 32a, 32b, 32c, and 32d on the front surface, piezoelectric layers 42a, 42b, 42c, and 42d of the four piezoelectric elements 32a, 32b, 32c, and 32d, and electrode layers 62a, 62b, 62c, and 62d.

Further, the piezoelectric element 32e on the back surface includes an electrode layer 53, a piezoelectric layer 42e, and an electrode layer 62e. Note that, the polarity of polarization of each piezoelectric element 32 is indicated by (+) and arrows.

Further, the electrode layers 52 and 53 on the front and back surfaces are brought into conduction by coating a conductive paste before calcination as a conductive material 55.

A drive method is basically the same as that of the conventional example of FIGS. 12A to 12C. Specifically, one vertical vibration is generated with the piezoelectric element 32e by applying an AC voltage with a predetermined resonant frequency to a terminal Ve5, with a terminal Vg serving as the ground.

Further, one bending vibration can be generated with the piezoelectric elements 32a and 32d by applying the same AC voltage with a predetermined resonant frequency to terminals Va5 and Vd5 simultaneously, with the terminal Vg serving as the ground.

Further, similarly, an AC voltage with a predetermined resonant frequency is applied to the terminal Ve5 and the terminals Vb5 and Vc5, with the terminal Vg serving as the ground. This can generate a vertical vibration by the piezoelectric element 32e and another bending vibration with a different temporal phase by the piezoelectric elements 32b and 32c.

That is, two vibration modes can be generated by the four piezoelectric elements 32a, 32b, 32c, and 32d on the front surface and one vibration mode can be generated by the piezoelectric element 32e on the back surface.

Consequently, the protrusion 54 of the vibrating body 1e vibrates while drawing two elliptic loci to move a body to be driven. A method for producing the vibrating body 1e is basically the same as that of the vibrating body 1a of Example 1.

Example 6

As Example 6 of the present invention, a configuration example of a vibrating body for a vibratory drive unit having a different form from that of Examples above is described with reference to FIGS. 7A to 7C.

Figure 7A:
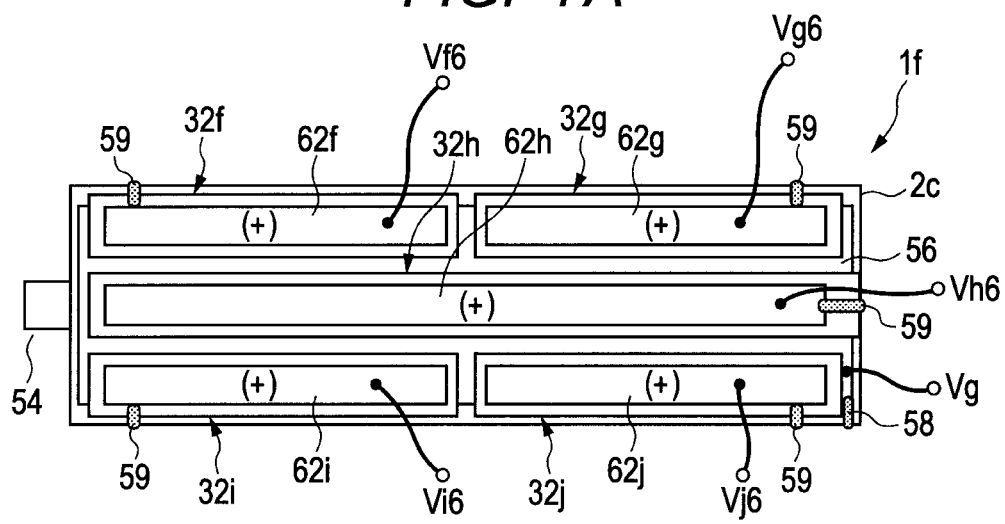
FIG. 7A is a view illustrating the front surface of a configuration of a vibrating body according to Example 6 of the present invention.
Figure 7B:
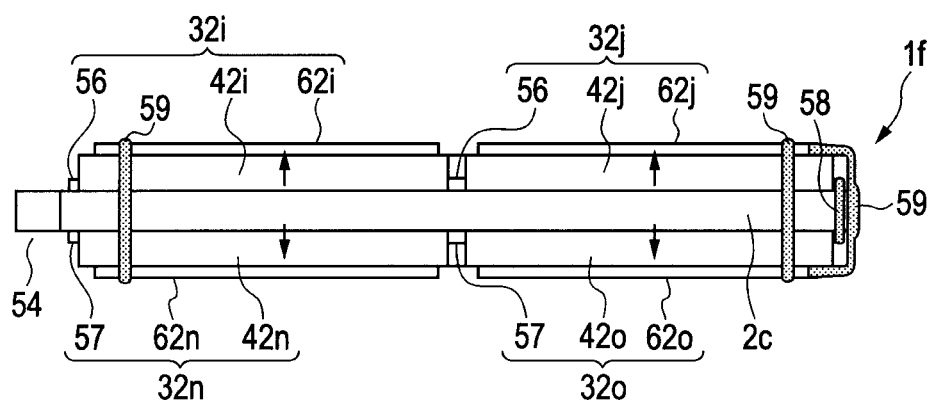
FIG. 7B is a view illustrating the side surface of the configuration of the vibrating body according to Example 6 of the present invention.
Figure 7C:
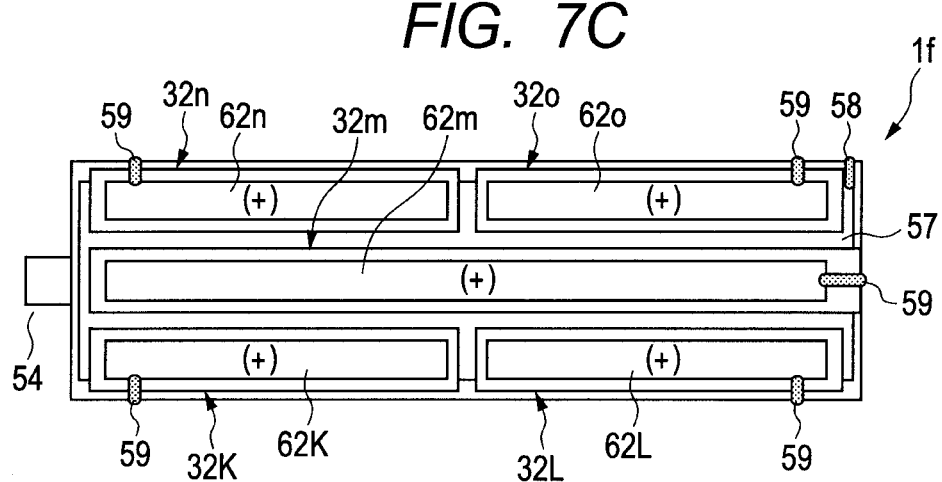
FIG. 7C is a view illustrating the back surface of the configuration of the vibrating body according to Example 6 of the present invention.
Figure 8:
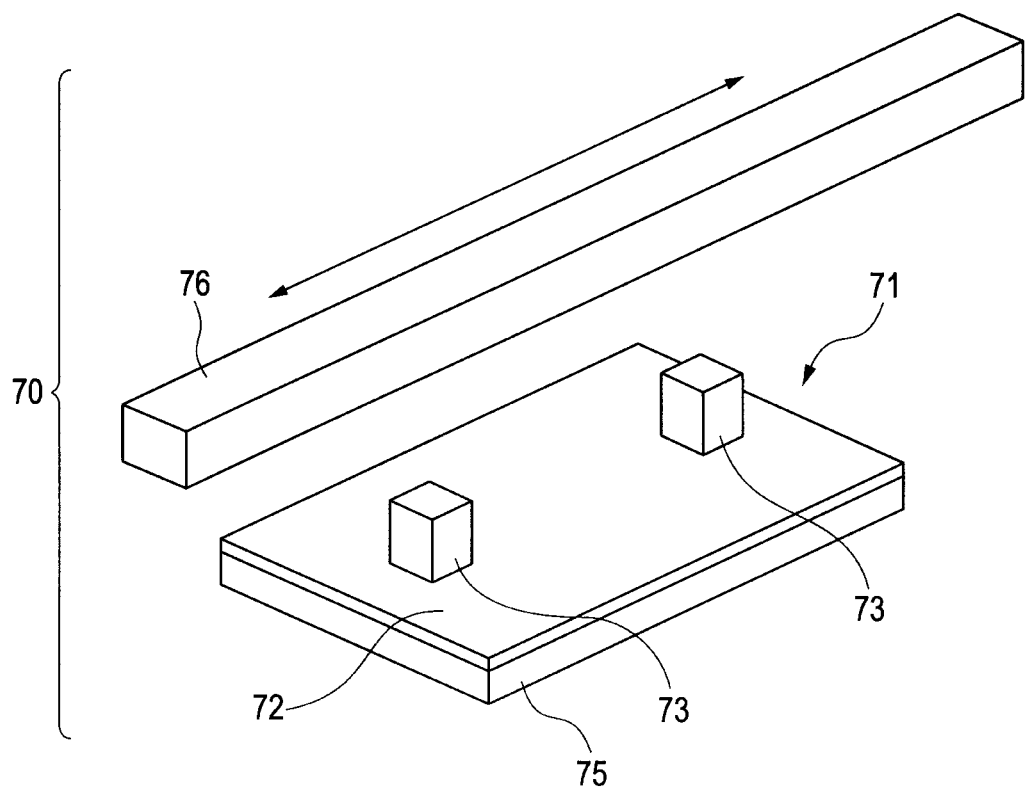
FIG. 8 is a view illustrating a configuration of a linear vibration wave actuator of Japanese Patent Application Laid-Open No. 2004-304887 of the conventional example.

FIGS. 7A to 7C respectively illustrate a front surface, a side surface, and a back surface of a vibrating body 1f.

The vibrating body 1f illustrated in FIGS. 7A to 7C is a vibrating body replacing the piezoelectric element of the piezoelectric actuator previously described in FIGS. 12A to 12C.

In this example, a number of piezoelectric elements 32 are provided on each of the front and back surfaces of the vibrating body 1f having the protrusion 54, and two different vibration modes similar to those of Example 5 can be generated in the vibrating body 1f by the opposed piezoelectric elements 32 formed on the front and back surfaces.

The vibrating body 1f and the piezoelectric elements 32 are bonded (fixed) to and integrated with each other without using an adhesive layer, by simultaneous calcination in the same way as in Examples described above.

The vibrating body 1f includes the plate-shaped elastic member 2c and the piezoelectric elements 32. Piezoelectric elements 32f, 32g, 32h, 32i, and 32j are formed on the front surface of the vibrating body 1f.

Further, piezoelectric layers 42f, 42g, 42h, 42i, and 42j are formed on a common electrode 56, and electrode layers 62f, 62g, 62h, 62i, and 62j are respectively formed on the piezoelectric layers 42f, 42g, 42h, 42i, and 42j.

Similarly, piezoelectric elements 32k, 32L, 32m, 32n, and 32o are formed on the back surface. Piezoelectric layers 42k, 42L, 42m, 42n, and 42o are formed on a common electrode 57, and electrode layers 62k, 62L, 62m, 62n, and 62o are respectively formed on the piezoelectric layers 42k, 42L, 42m, 42n, and 42o.

The common electrodes 56 and 57 are brought into conduction by a conductive material 58 formed by coating a conductive material paste before calcination.

Then, the respective electrode layers 62f and 62k, 62g and 62L, 62h and 62m, 62i and 62n, and 62j and 62o of the opposed piezoelectric elements 32 on the front and back surfaces are brought into conduction by a conductive material 59 formed before calcination.

Note that, the polarity of polarization is indicated by (+) and arrows in FIGS. 7A to 7C. Here, in this example, both the vertical vibration and the bending vibration are those in a plane (plane direction of the elastic member), unlike Examples 2 and 4. Therefore, the polarity of polarization is set to be the same, when viewed from the common electrodes 56 and 57.

This allows the opposed piezoelectric elements to be set as a unit to generate a vibration with a voltage to be applied.

For driving, an AC voltage close to a resonant frequency is applied to a terminal Vh6, with a terminal Vg serving as the ground, to thereby generate a vertical vibration.

Then, by applying the same AC voltage close to a resonant frequency to terminals Vf6 and Vj6 simultaneously, a bending vibration can be generated.

Further, when an AC voltage close to a resonant frequency is applied to terminals Vg6 and Vi6, another bending vibration can be generated. That is, in the same way as in the conventional example, the protrusion 54 of the vibrating body if can vibrate while drawing two elliptic loci due to one vertical vibration and two bending vibrations.

A production method is basically the same as that of Example 1.

As described above, the present invention provides a vibrating body of a downsized vibratory actuator, in which one or multiple piezoelectric elements including piezoelectric layers and electrode layers are provided on the front and back surfaces of a plate-shaped elastic member by a thick film printing method.

As described in Examples 1 to 6, the present invention has the possibility of replacing various kinds of vibrating bodies or piezoelectric elements. In particular, the production of a piezoelectric element and the bonding between the piezoelectric element and the elastic member can be performed simultaneously. Therefore, an inexpensive vibrating body can be produced. In addition, piezoelectric elements can be formed on the front and back surfaces of the elastic member, and hence a high output can be obtained.

Further, as another advantage, multiple vibration modes to be generated can be generated separately by the piezoelectric elements on the front and back surfaces in Examples 1, 3, and 5, and hence, there is an effect that an undesired vibration other than the multiple vibration modes can be reduced.

Further, as in Examples 2, 4, and 6, a conductive wire for applying a voltage to a piezoelectric element can be provided only on one surface side, and hence, practically, a method of supplying a voltage becomes simpler.

Although a vibrating body is produced by a thick film printing method in the examples, the vibrating body can be produced even by another thick film or thin film formation method.

Note that, generally, in order to produce a vibratory drive unit with the dimension of several millimeters to about twenty to thirty millimeters, a thick film printing method is most suitable, considering a facility investment, a production process, a material cost, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282681, filed Dec. 20, 2010, which is hereby incorporated by reference herein in its entirety.

What is claimed is:

1. A vibrating body for a vibratory drive unit, comprising:
a first piezoelectric element including a first piezoelectric layer and a first electrode layer;
a second piezoelectric element including a second piezoelectric layer and a second electrode layer;
a third piezoelectric element including a third electrode layer; and
an elastic member bonded to the first piezoelectric element and the second piezoelectric element,
wherein the vibrating body drives a body to be driven by a vibration generated in the elastic member through an application of a drive voltage to the first piezoelectric element and the second piezoelectric element,
wherein the elastic member has a front surface and a back surface,
wherein the first piezoelectric element is provided on the front surface and the second piezoelectric element is provided on the back surface of the elastic member,
wherein the first electrode layer and the second electrode layer are brought into conduction,
wherein the third electrode layer and the second electrode layer are brought into conduction,
wherein the third piezoelectric element is provided in parallel to the first piezoelectric element, which is provided on the front surface of the elastic member, and
wherein the vibration includes at least two different vibration modes.

2. The vibrating body for a vibratory drive unit according to claim 1, wherein the first and the second electrode layers are brought into conduction by one of conductive materials formed on the front surface, the back surface, and a side surface of the elastic member and a conductive material provided in a hole passing through an inside of the elastic member.

3. The vibrating body for a vibratory drive unit according to claim 1, wherein the first and the second piezoelectric elements are formed on the elastic member by a thick film printing method, and calcined together with the elastic member to integrate with the elastic member.

4. The vibrating body for a vibratory drive unit according to claim 1, wherein the elastic member comprises ceramics.

5. A vibratory drive unit, comprising the vibrating body for a vibratory drive unit according to claim 1 as a drive power source.

6. The vibrating body for a vibratory drive unit according to claim 1, wherein the at least two different vibration modes are different vibration modes between the front surface and the back surface of the elastic member.

7. The vibrating body for a vibratory drive unit according to claim 1, wherein the body to be driven is in contact with the elastic member when the body to be driven is driven by the vibratory drive unit.

* * * * *